US005726846A

United States Patent [19]

Houbre

[11] Patent Number: 5,726,846

[45] Date of Patent: Mar. 10, 1998

[54] TRIP DEVICE COMPRISING AT LEAST ONE CURRENT TRANSFORMER

[75] Inventor: Pascal Houbre, St. Martin D'Heres, France

[73] Assignee: Schneider Electric SA, France

[21] Appl. No.: 529,975

[22] Filed: Sep. 19, 1995

[30] Foreign Application Priority Data

Sep. 29, 1994 [FR] France .................................... 94 11814

[51] Int. Cl.$^6$ .................................... H02H 3/00

[52] U.S. Cl. .................................... 361/93; 336/165

[58] Field of Search .................................... 336/165; 361/42, 361/35, 38, 93

[56] References Cited

U.S. PATENT DOCUMENTS

| | | | |
|---|---|---|---|
| 3,962,661 | 6/1976 | Boyd et al. | 336/84 |
| 4,613,841 | 9/1986 | Roberts | 336/165 |

FOREIGN PATENT DOCUMENTS

| | | |
|---|---|---|
| 0012629 | 6/1980 | European Pat. Off. . |
| 0039485 | 11/1981 | European Pat. Off. . |
| 0254464 | 1/1988 | European Pat. Off. . |
| 2532793-A | 3/1984 | France . |
| 1638602 | 9/1970 | Germany . |
| 1094225 | 12/1967 | United Kingdom . |
| WO 81/01218 | 4/1981 | WIPO . |

*Primary Examiner*—Jeffrey A. Gaffin
*Assistant Examiner*—Sally C. Medley
*Attorney, Agent, or Firm*—Parkhurst & Wendel

[57] ABSTRACT

A trip device comprises at least one current transformer for supplying power to electronic circuits. The current transformer comprises a magnetic circuit, surrounding a primary conductor, a secondary winding wound onto a part of the magnetic circuit forming a core, and a magnetic shunt branch connected on the magnetic core. The magnetic shunt comprises an air-gap. When the current flowing in the primary conductor is of low value, the magnetic flux stopped by the air-gap flows essentially via the core of the secondary winding. At high current levels the induction is greater and a large part of the magnetic flux passes through the shunt via the air-gap. The current transformer has a non-linear current response which limits excess power supplied to the electronic circuits and dissipated in the transformer. The trip device is useful, for example, in a circuit breaker.

11 Claims, 7 Drawing Sheets

TRIP DEVICE COMPRISING AT LEAST ONE CURRENT TRANSFORMER

BACKGROUND OF THE INVENTION

The invention relates to a trip device comprising.

at least one current transformer, associated to a conductor of a circuit to be protected in which a primary current is flowing, comprising a main magnetic circuit surrounding the conductor of the circuit to be protected, and at least one secondary winding, a part of the main magnetic circuit forming the core of the secondary winding, and a processing unit connected to said current transformer secondary winding.

In known trip devices, current transformers supply the electrical power necessary for system-powered operation of associated electrical or electronic circuitry. The current transformers are fitted on conductors of a power circuit to be protected. They supply electronic trip circuits with low intensity secondary currents proportional to very strong primary currents.

In the present state-of-the-art, AC secondary currents are rectified and regulated with the purpose of supplying DC supply voltages to the tripping circuits. As the consumption of the circuits is stable or varies very little, the excess energy supplied by the transformers is dissipated by regulation circuits and by the transformers themselves.

Generally the minimum operating secondary current corresponds to the consumption of the tripping circuits. When the trip device is fitted in a circuit breaker, operation must usually be ensured between 0.1 and 10 times the rated current.

The devices must comprise transformers of large dimensions suitable to dissipate the excess energy transformed into heat. For the same reasons, the electronic power components of the regulation circuits have to be overdimensioned and fitted on voluminous cooling devices.

Saturated iron current transformers make it possible to reduce the secondary current at high current level and to limit the power supplied to the regulation circuits. However, the operation of the saturated iron transformers does not enable the problems of size and overheating to be solved efficiently across the whole operating range of a typical trip device.

SUMMARY OF THE INVENTION

The object of the invention is to promise a trip device comprising at least one current transformer supplying a reduced power at strong primary current.

This object is achieved by the fact that the transformer comprises a magnetic shunt branch connected on the part of the main magnetic circuit constituting the core of the secondary winding, the magnetic shunt comprising a total or partial air-gap locally reducing the cross-section of the shunt.

The current response of the transformer is not linear over the whole operating range.

According to a preferred embodiment of the invention, the magnetic shunt is positioned between the primary conductor and the secondary winding.

In a particular embodiment, the cross-section of the magnetic shunt near the air-gap is greater than the cross-section of the magnetic circuit at the location of the core of the secondary winding.

Furthermore, the size of the air-gap can vary at different places of the cross-section of the shunt.

Furthermore still, the air-gap can be located appreciably in the middle of the magnetic shunt or between the shunt and the main magnetic circuit.

According to a development of the invention, the shunt and main magnetic circuit form a single part.

Preferably at least one secondary winding comprises an electromagnetic shielding.

In devices according to an embodiment of the invention, the current transformer, essentially supplying electrical operating power, is associated to a current measuring sensor. The current measuring sensor is preferably a Rogowski toroid.

The device according to the invention is in particular designed to be used in circuit breakers.

BRIEF DESCRIPTION OF THE DRAWINGS

Other advantages and features will become more clearly apparent from the following description of particular embodiments of the invention, given as non-restrictive examples only and represented in the accompanying drawings in which.

DESCRIPTION OF THE PREFERRED EMBODIMENT

Figure 1:
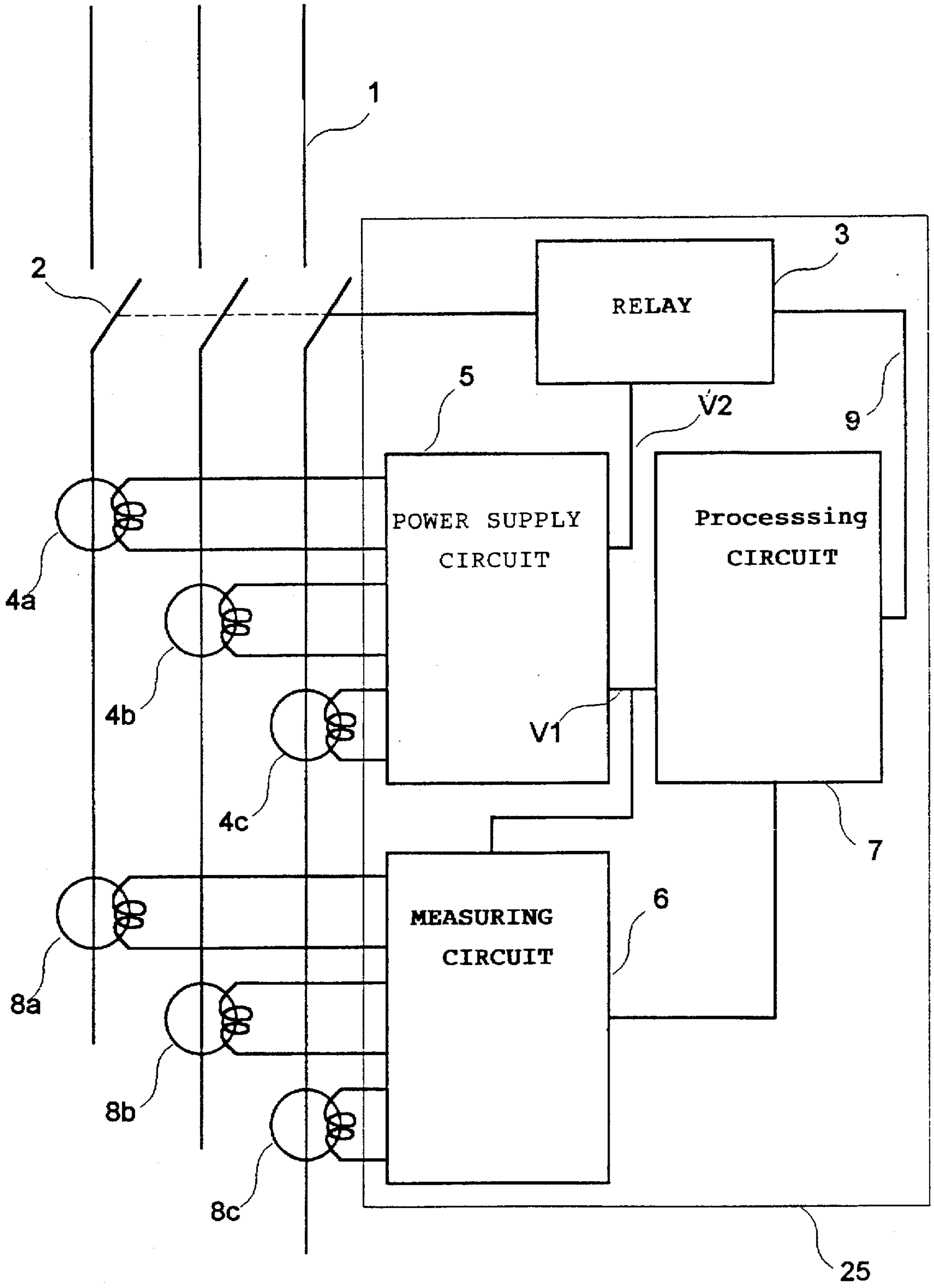
FIG. 1 ( PRIOR ART )
FIG. 1 represents a block diagram of a trip device fitted in a circuit breaker.

The block diagram of FIG. 1 represents a trip device fitted in a circuit breaker to protect an electrical power system 1 against overloads or short-circuits. Contacts 2 of the circuit breaker, operated by the trip device, establish or interrupt the current in the power system conductors. Opening of the contacts 2 is controlled by a relay 3.

The trip device comprises current transformers 4*a*, 4*b* and 4*c* associated to the power system conductors to supply the electrical power necessary for operation of the electronic circuitry of a processing unit 25. The secondary windings of the current transformers are connected to a power supply circuit 5 which rectifies the alternating current supplied by the secondary windings of the transformers and supplies one or more regulated DC voltages. For example, a first DC voltage V1 is supplied to measuring and processing circuits, respectively 6 and 7, whereas a second DC voltage V2 supplies the relay 3. The processing unit 25 comprises the relay 3 and circuits 5, 6 and 7.

Current measuring sensors 8*a*, 8*b* and 8*c*, associated to the power system conductors, have secondary windings connected to the measuring circuit 6. The circuit 6 amplifies and shapes signals representative of the currents of the conductors coming from the sensors 8*a*, 8*b* and 8*c*. It then sends them to the processing circuit 7. The processing circuit 7 sends a tripping order 9 when the signals representative of the currents of the conductors exceed preset thresholds during preset times. The sensors 8*a*, 8*b* and 8*c* can, for example, be measuring transformers, Rogowski toroids or Hall effect cells.

Figure 2:
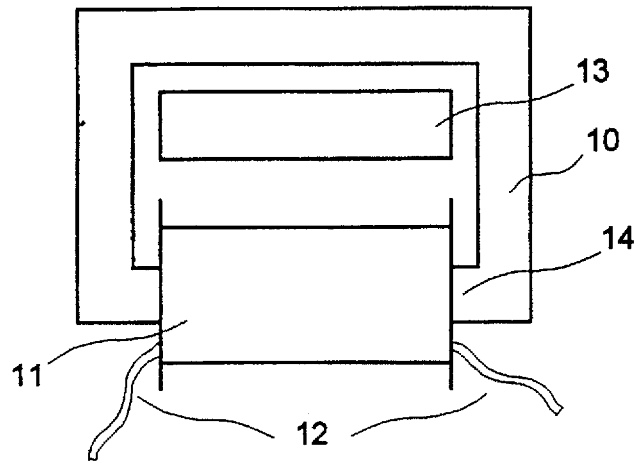
FIG. 2 ( PRIOR ART )
FIG. 2 represents a known current transformer.

FIG. 2 represents a known current transformer able to be used as transformers 4*a*, 4*b* or 4*c*. This known current transformer comprises a magnetic circuit 10 and a secondary winding represented by a coil 11 and two output wires 12. The magnetic circuit, generally formed by stacked metal plates, completely surrounds a conductor 13 of the power system 1 where the primary current of the transformer is flowing. A part 14 of the magnetic circuit 10 passes in the centre of the secondary winding and forms the core of the coil 12.

Current transformers like that of FIG. 2 have an appreciably linear current response over a wide operating range. When the primary current increases, the secondary current increases as well and a large part of the excess power is dissipated in the transformer and power supply circuit 5.

According to the invention, the transformers 4*a*, 4*b* and 4*c* of the trip device of FIG. 1 are current transformers comprising a magnetic shunt with an air-gap.

Figure 3:
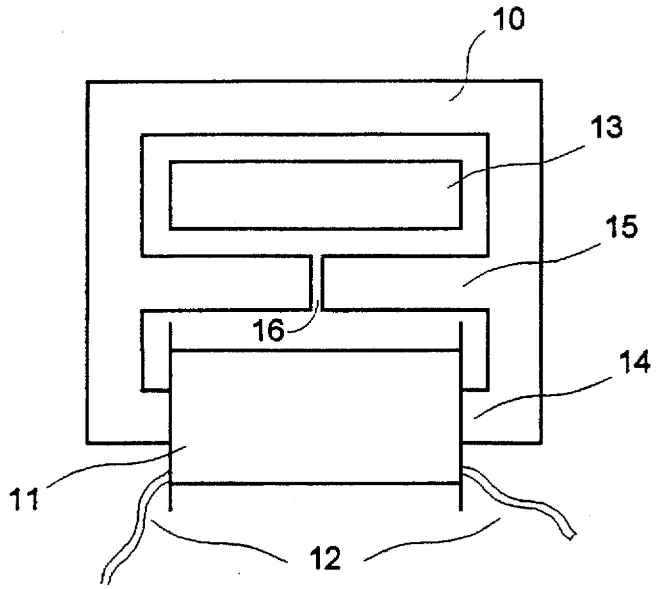
FIG. 3 represents a current transformer according to an embodiment of the invention able to form part of a trip device according to FIG. 1.

FIG. 3 shows an embodiment of a transformer of this type. A magnetic shunt 15 branch connected on the magnetic core 14 of the secondary winding, comprises an air-gap 16.

At low primary current level, only a very small portion of the magnetic flux can pass via the shunt and through the air-gap. Almost all the flux then passes via the magnetic core. When the primary current increases the proportion of magnetic flux able to pass via the shunt increases and the proportion of flux passing via the core decreases. The shunt air-gap causes a non-linear behaviour of the transformer. The magnetic flux passing through the air-gap increases very quickly when the magnetic induction produced by the primary current flowing in the conductor 13 exceeds a certain threshold, which is determined by the size and shape of the air-gap.

Figure 4:
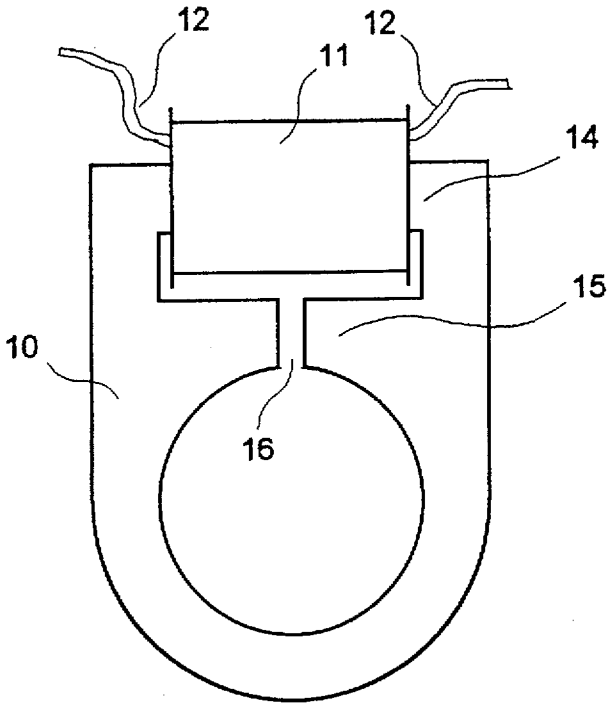
FIGS. 4 and 5 show two alternative embodiments of current transformers according to FIG. 3.
Figure 5:
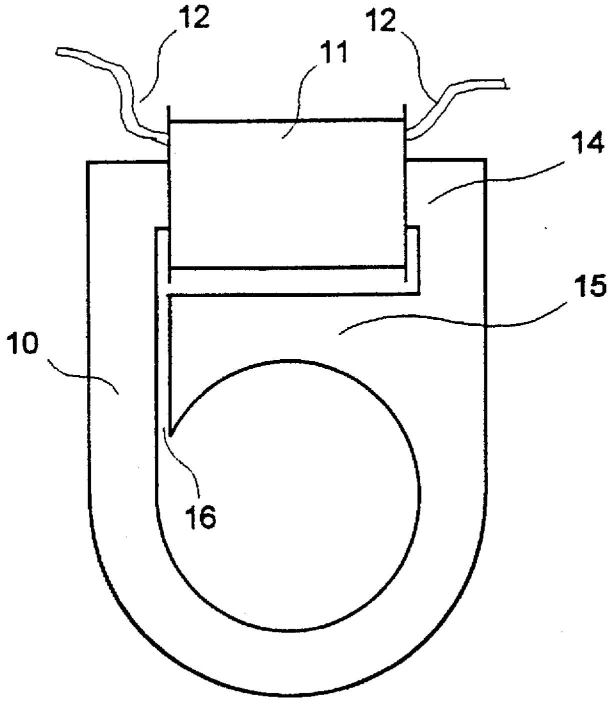

FIGS. 4 and 5 show alternative transformers according to two other embodiments of the invention. The part of the magnetic circuit surrounding the primary conductor has a rounded shape comprising the magnetic shunt 15. The transformer of FIG. 4 comprises an air-gap located appreciably in the middle of the shunt. The air-gap of the transformer of FIG. 5 is located between one end of the shunt and a part of the main magnetic circuit 10 connecting a zone close to the primary conductor and the core of the secondary winding. In this case the cross-section of the magnetic shunt 15 near the air-gap is larger than the cross-section of the magnetic circuit at the location of the core 14 of the secondary winding.

In a preferred embodiment, the main magnetic circuit 10 and shunt 15 form a single part an a can be formed by stacked metal plates or by other magnetic materials.

Figure 6:
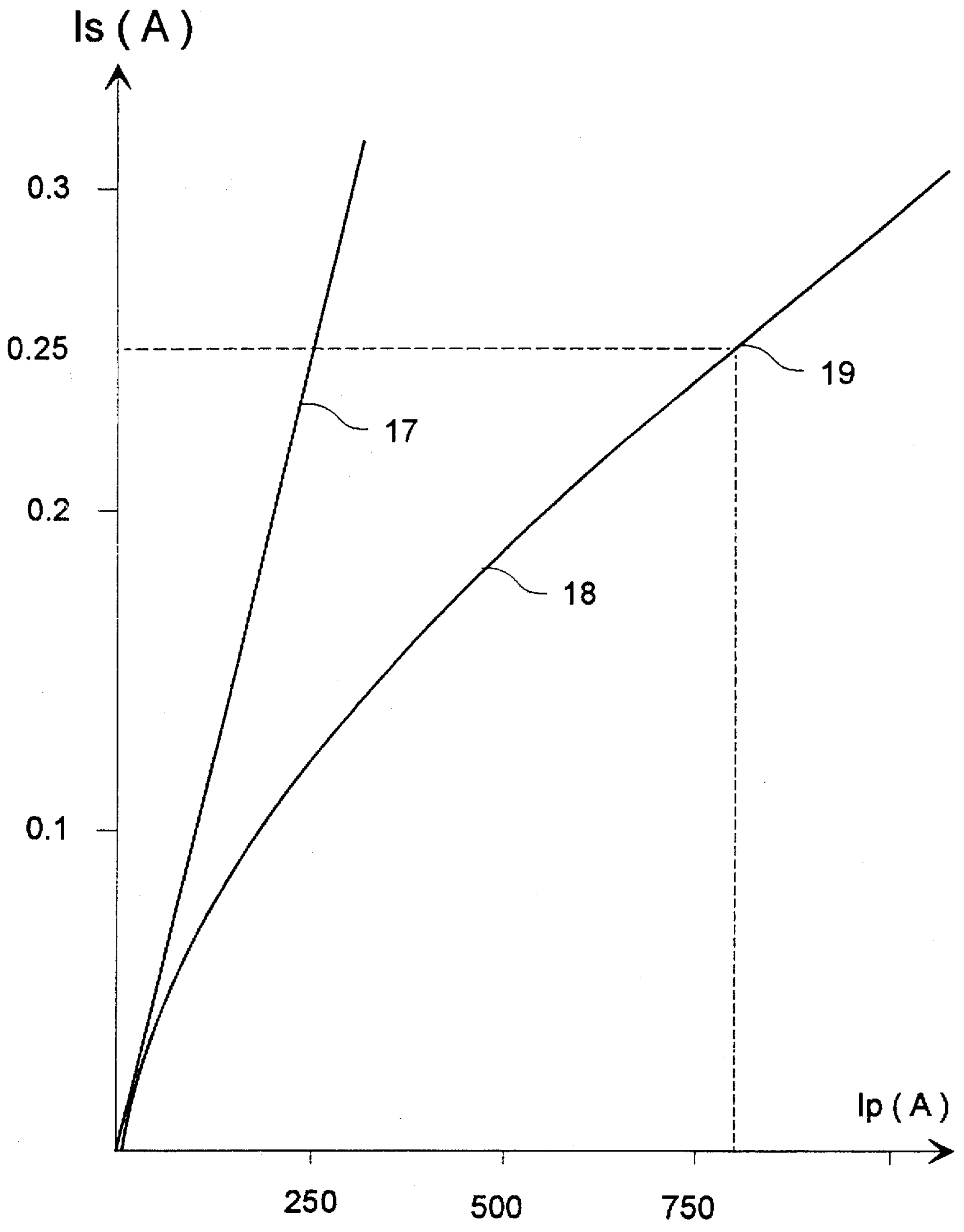
FIG. 6 represents the current response curves of the transformers of FIGS. 2 and 3.

Response curves of the secondary current is versus the primary current Ip of the current transformers of FIGS. 2 and 3 are represented in FIG. 6. A first curve 17 represents the response in rms current of the transformer of known type not comprising a shunt. The aspect of the curve 17 is almost linear. The secondary current Is is appreciably proportional to the primary current Ip. A second curve 18 represents the response in rms current of the transformer according to an embodiment of the invention comprising a shunt with an air-gap.

So long as the primary current Ip is weak, the secondary currents of the two transformers corresponding to the curves 17 and 18 have similar values. When the current increases, the response curve 18 of the transformer comprising a shunt with an air-gap becomes weaker than the curve 17 of the transformer without a shunt. For example, for a current of 800 A the transformer with a shunt with an air-gap supplies a secondary current of about 0.25 A (point 19 on curve 18) whereas the transformer without a shunt supplies a current of 0.8 A.

Figure 7A:
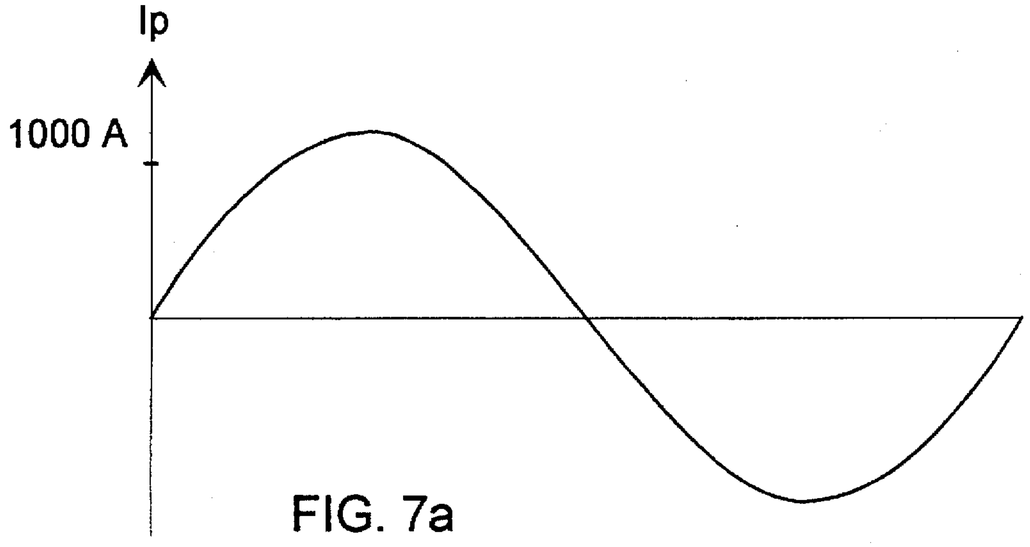
FIGS. 7*a*, 7*b* and 7*c* illustrate the currents for a particular point of curve 6.
Figure 7B:
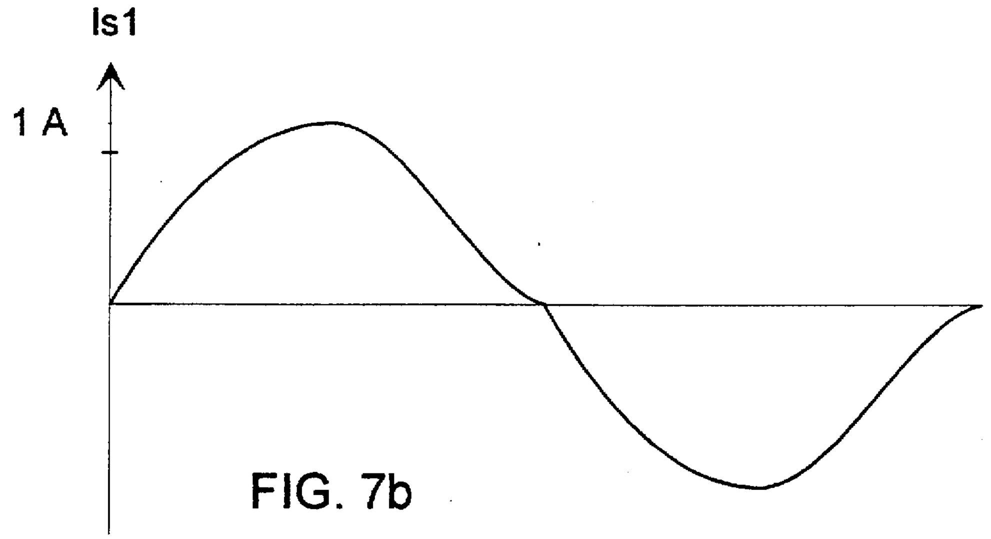
Figure 7C:
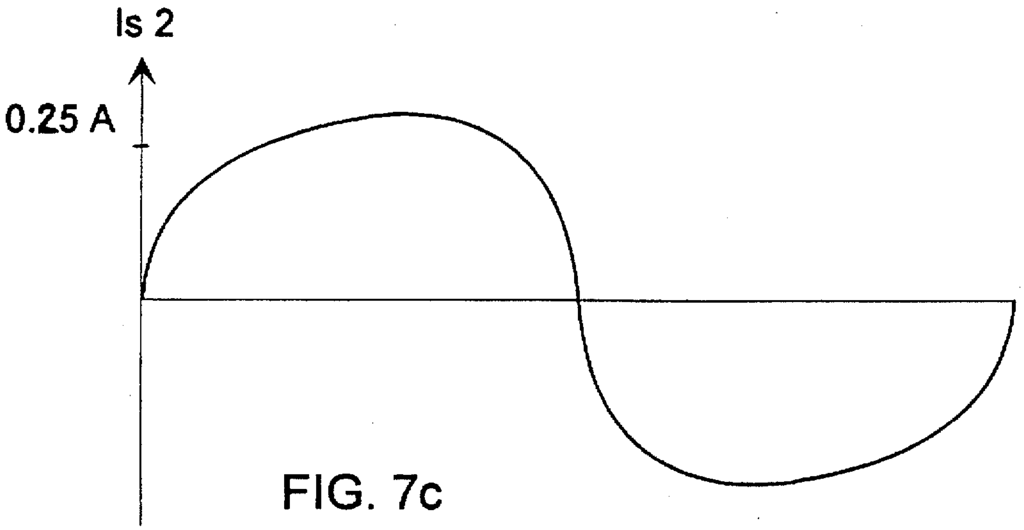

The shapes of the primary and secondary currents are illustrated in the curves of FIGS. 7*a*, 7*b* and 7*c*. The sinusoidal primary current Ip, having a value of 800 A, passes through the primary of a first transformer according to FIG. 2 and the primary of a second transformer according to FIG. 3. FIG. 7*b* shows a secondary current Is1 of the first transformer. The rms value of the current Is1 is 0.8 A and its shape is appreciably sinusoidal. FIG. 7*c* shows a secondary current Is2 of the second transformer comprising a magnetic shunt according to an embodiment of the invention. The current Is2 is deformed and its value, about 0.25 A, is much lower than that of the current Is1. For a primary current Ip=800 A the power dissipated in the secondary winding of the first transformer without a shunt is 9 W whereas the power dissipated in the winding of the second transformer comprising a magnetic shunt is only 0.9 W.

The response of the secondary current Is as a function of the primary current Ip of the transformers comprising a shunt with air-gap depends on the shape, surface and thickness of the air-gap. The transformers of FIGS. 3 to 5 have air-gaps of constant thickness opening the whole cross-section of the shunts 15. However other shapes of air-gaps are possible. FIGS. 8 to 11 show various embodiments of air-gaps.

Figure 8:
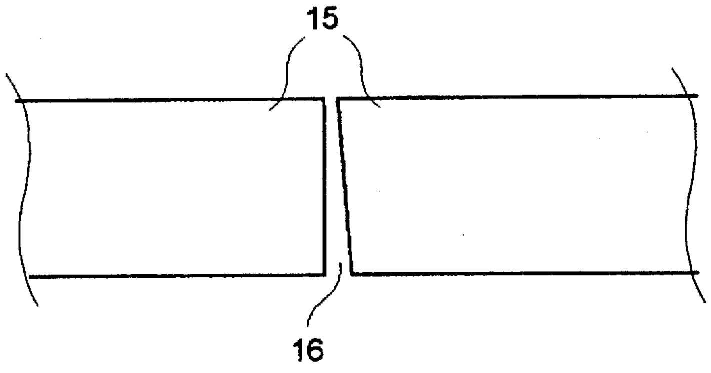
FIGS. 8 to 11 show alternative air-gaps of the current transformers of FIGS. 3 to 5.

The thickness of the air-gap can be variable to improve the response at high current level. FIG. 8 shows an air-gap having a different thickness at different places of the cross-section of the shunt.

Figure 9:
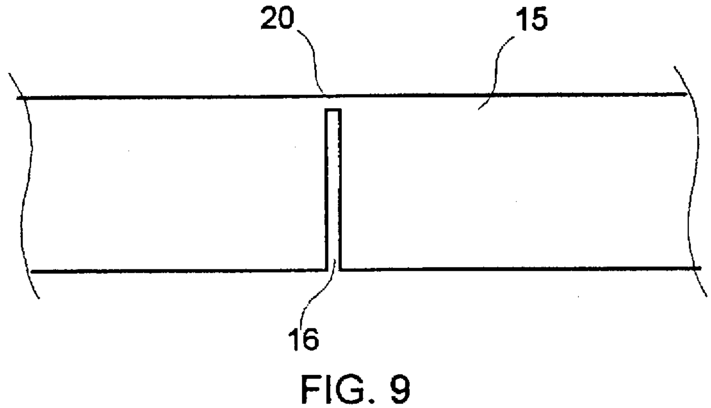

FIG. 9 shows a shunt comprising a partial air-gap. In this embodiment, a large part of the magnetic circuit of the shunt is cut by the air-gap and a small part remains connected. In this case, attenuation begins with lower primary currents.

Figure 10:
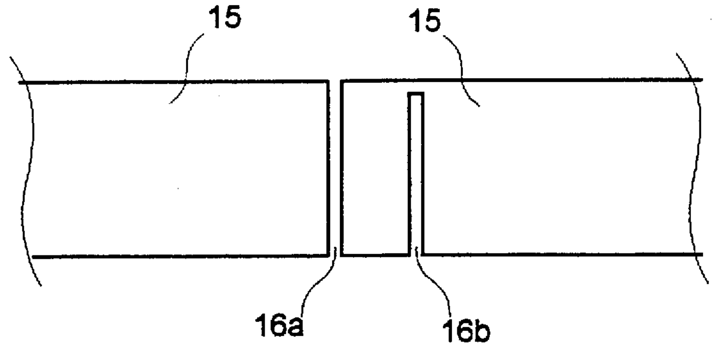

The magnetic shunt 15 can comprise several air-gaps, for example a total air-gap 16*a* and a partial air-gap 16*b* as represented in FIG. 10.

Figure 11:
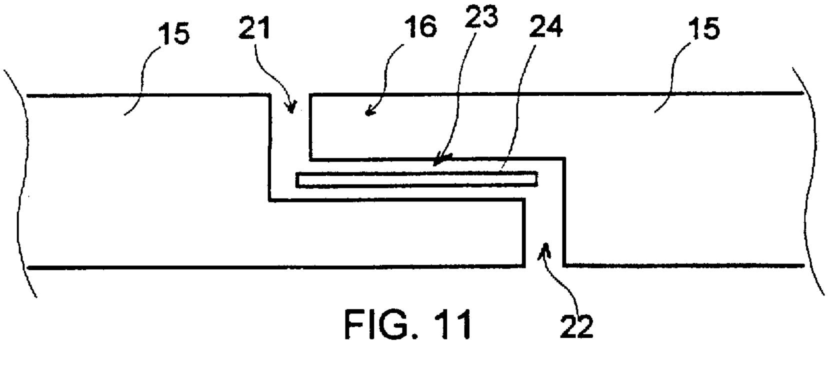

FIG. 11 represents a shunt comprising a complex air-gap. The air-gap comprises a transverse first part 21 and second part 22 and a longitudinal part 23 joining the transverse first and second parts. The effects of the air-gap being essentially in the longitudinal part, this arrangement provides a large air-gap surface and enables a high magnetic flux flow to be obtained with a strong primary current.

The air-gap of the magnetic shunt is generally a slot left in the open air but it may be totally or partially filled by a non-magnetic solid material. The air-gap of the longitudinal part 23 of the shunt of FIG. 11 comprises a non-magnetic solid component 24. This non-magnetic solid component 24 prevents impurities from entering the void of the air-gap. An air-gap of small thickness can advantageously be formed by a shield made of non-magnetic solid material.

The electrical current supplied by the transformers described above supplies the electronic power supply or control circuitry, but it can also be used for tripping functions. The current is then measured and processed by the electronic circuitry to supply a tripping order if certain values are exceeded.

Figure 12:
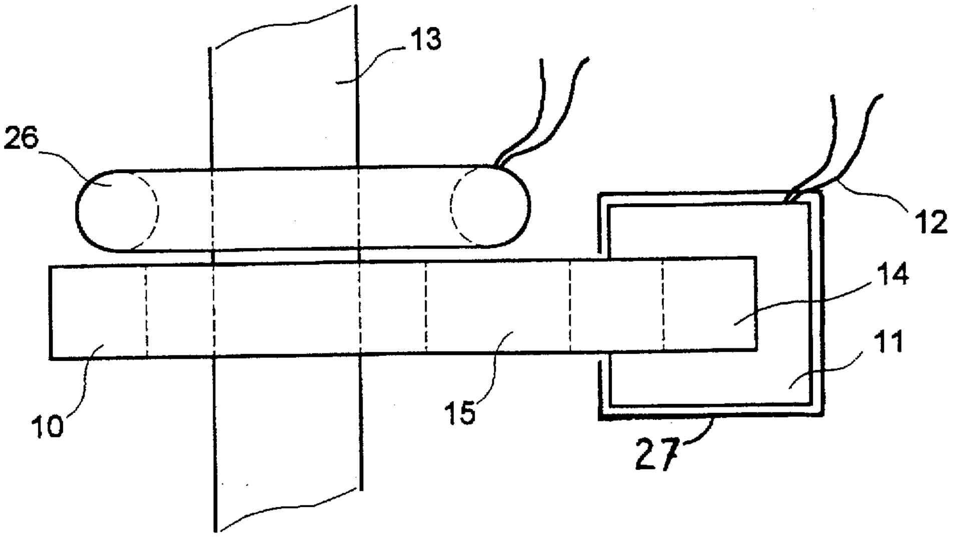
FIG. 12 shows a transformer according to an embodiment of the invention associated to a Rogowski toroid.

The current transformers with magnetic circuits can be associated to Rogowski type air transformers. In FIG. 12, the primary conductor 13 passes through the magnetic circuit of a transformer according to the invention and the centre of a Rogowski toroid 26. The secondary of the first transformer according to the invention supplies electronic circuitry and the secondary of the Rogowski toroid supplies measuring and processing circuits with the signal representative of the current flowing in the primary conductor. The transformer and Rogowski toroid are preferably fixed to one another, for example by overcasting.

For primary currents Ip of very high values, the part of the magnetic circuit surrounded by a secondary winding may not be saturated. Strong primary currents from neighbouring conductors may then induce external electromagnetic fluxes and generate additional secondary currents in the secondary winding. To limit these effects the device of FIG. 12 comprises an electromagnetic shielding 27.

The current transformers of a device according to the invention can have very varied forms. In the magnetic circuits described above and shown in the figures, the shunt with air-gap is arranged between the primary conductor and the secondary winding. However it is quite possible to arrange the shunt branched off on the core of the secondary coil opposite the primary conductor. The secondary winding would then be located between the primary conductor and the shunt. This arrangement may be advantageous depending on the volume allocated to the current transformer.

The main circuits of the transformers shown in FIGS. 3 to 5 are generally closed but they can themselves comprise air-gaps. For example, a transformer according to the invention can comprise a magnetic circuit with a secondary winding core comprising a partial or total air-gap and a magnetic shunt also comprising a partial or total air-gap. This arrangement can enable the magnetic flux to be better distributed between the shunt and core depending on the value of the primary current.

In the embodiments described above the transformers comprise a single secondary winding and a single shunt, but the invention also applies to devices comprising transformers with several secondary windings and/or several shunts.

I claim:

1. A trip device, comprising:

at least one current transformer, associated to a single conductor of a circuit to be protected in which a primary current is flowing, comprising a main magnetic circuit surrounding the conductor of the circuit to be protected, and at least one secondary winding, a part of the main magnetic circuit forming the core of the secondary winding, and a processing unit connected to said current transformer secondary winding, said current transformer comprising a magnetic shunt branch, connected on the part of the main magnetic circuit constituting the core of the secondary winding, for shunting a magnetic flux produced by the primary current to substantially bypass the core of the secondary winding when said primary current exceeds a preset threshold, the magnetic shunt comprising a total or partial air-gap locally reducing the cross-section of said shunt for the determination of said threshold in terms of the size and shape of the air-gap, whereby the power transferred to the secondary winding or processing unit is reduced.

2. The device according to claim 1, wherein the magnetic shunt branch is positioned between the conductor and the secondary winding.

3. The device according to claim 1, wherein the thickness of the air-gap is variable.

4. The device according to claim 1, wherein the cross-section of the magnetic shunt branch at the location of the air-gap is greater than the cross-section of the main magnetic circuit at the location of the core of the secondary winding.

5. The device according to claim 1, wherein the air-gap is located substantially in the middle of the magnetic shunt branch.

6. The device according to claim 1, wherein the air-gap of the magnetic shunt branch is located at one end of the magnetic shunt branch.

7. The device according to claim 1, wherein the magnetic shunt branch and the main magnetic circuit form a single part.

8. The device according to claim 1, further comprising a current transformer connected to a power supply circuit of the processing unit, and a current sensor connected to a measuring circuit of the processing unit, the current transformer being associated to the current sensor on the same conductor of the circuit to be protected.

9. The device according to claim 8, wherein the current measuring sensor is a Rogowski toroid.

10. The device according to claim 1, wherein at least one secondary winding comprises electromagnetic shielding.

11. A trip device, comprising:

at least one current transformer, associated with a single conductor of a circuit to be protected in which a primary current is flowing, comprising a main magnetic circuit surrounding the conductor of the circuit to be protected, and at least one secondary winding, a part of the main magnetic circuit forming the core of the secondary winding;

a processing unit connected to said secondary winding of said current transformer; and means for reducing the power supplied to said secondary winding during periods of excess primary current flowing through said conductor.

* * * * *